US008659600B2

(12) United States Patent
Kraemer et al.

(10) Patent No.: US 8,659,600 B2
(45) Date of Patent: Feb. 25, 2014

(54) GENERATING VECTOR DISPLACEMENT MAPS USING PARAMETERIZED SCULPTED MESHES

(75) Inventors: Manuel Kraemer, Oakland, CA (US); William Polson, San Rafael, CA (US)

(73) Assignee: Pixar, Emeryville, CA (US)

( * ) Notice: Subject to any disclaimer, the term of this patent is extended or adjusted under 35 U.S.C. 154(b) by 282 days.

(21) Appl. No.: 13/182,384

(22) Filed: Jul. 13, 2011

(65) Prior Publication Data

US 2013/0016101 A1 Jan. 17, 2013

(51) Int. Cl.
G06T 13/40 (2011.01)
(52) U.S. Cl.
USPC ............ 345/423; 345/419; 345/420; 345/424
(58) Field of Classification Search
USPC .................. 345/419, 420, 423, 424
See application file for complete search history.

(56) References Cited

U.S. PATENT DOCUMENTS

| | | | | |
|---|---|---|---|---|
| 4,378,118 A * | 3/1983 | Leonardi, Jr. | | 273/292 |
| 5,113,451 A * | 5/1992 | Chapman et al. | | 382/145 |
| 5,602,943 A * | 2/1997 | Velho et al. | | 382/266 |
| 6,470,287 B1 * | 10/2002 | Smartt | | 702/102 |
| 6,738,062 B1 * | 5/2004 | Moreton | | 345/423 |
| 6,765,584 B1 * | 7/2004 | Wloka et al. | | 345/584 |
| 6,867,769 B1 * | 3/2005 | Toriya et al. | | 345/420 |
| 7,023,435 B1 * | 4/2006 | Litke et al. | | 345/420 |
| 7,825,937 B1 * | 11/2010 | Sakhartchouk et al. | | 345/582 |
| 7,903,125 B1 * | 3/2011 | Ayers et al. | | 345/629 |
| 2002/0093513 A1 * | 7/2002 | Kamen et al. | | 345/621 |
| 2004/0164982 A1 * | 8/2004 | Fujiwara et al. | | 345/419 |
| 2007/0070070 A1 * | 3/2007 | John | | 345/427 |
| 2007/0098279 A1 * | 5/2007 | Hahn et al. | | 382/238 |
| 2007/0188489 A1 * | 8/2007 | Lalvani | | 345/420 |
| 2008/0043017 A1 * | 2/2008 | Xue et al. | | 345/424 |
| 2009/0021522 A1 | 1/2009 | Burley et al. | | |

* cited by examiner

Primary Examiner — Xiao M. Wu
Assistant Examiner — Todd Buttram
(74) Attorney, Agent, or Firm — Kilpatrick Townsend & Stockton LLP

(57) ABSTRACT

A method and apparatus are provided for generating vector displacement maps, often in an interactive manner. Given a set of objects to be animated or imaged, they can be each represented by one or more faces. In a subdivision process, faces might be represented by polygons through a method of repeated subdividing. In the subdivision process, relative location of polygons relative to the original face (and possibly relative orientations) are maintained, for later use by other processes. This can be done by maintaining source data for each face of a subdivided surface, where source data indicates an original location on the original object that corresponds to that face and the polygons resulting from the subdividing. The source data can be a link, path, index or label for each face of the subdivision surface, where the source data indicates an original location on the original object that corresponds to that face.

18 Claims, 6 Drawing Sheets

Renderman – with and without disp

GENERATING VECTOR DISPLACEMENT MAPS USING PARAMETERIZED SCULPTED MESHES

BACKGROUND

The present invention relates generally to generating displacement maps and more particularly to using parameterized sculpted meshes to generate displacement maps.

In creating animation or still images using computer generated imagery, there are a number of tools available to artists and processes that occur in generating images from structured geometric descriptions of a scene. In some images, it is desirable to have a modeled object that has a texture overlaid on the object. For example, a modeled object might be a building and the texture could be an image of a brick pattern. Overlaying an image texture onto an object can tend to give the object a flat appearance.

Bump maps can be used to provide an interesting surface. A bump map is a surface, typically represented as a two-dimensional array of displacement values and when the bump map is applied to the surface of the object, either (a) the surface of the object is displaced or (b) the surface normal is modified, by an amount indicated by the value of the bump map at the location of the bump map that corresponds to a particular location on the object. Thus, when a renderer is provided with the bump map and the geometric description of the object (and light sources, etc.) the output is an image where the surface of the object looks textured.

Bump maps are limited in that they can only displace the surface of the object in the direction of the surface normal at the displaced point on the surface of the object. However, vector displacement maps are known, wherein each point on the displacement map surface (or more technically, at each discrete point on the displacement map surface for which a value is stored), the displacement map has a vector value indicating the displacement, so it can be in directions other than the surface normal.

For various processing purposes, the modeled object and the displacement map are separate data structures. For example, there are some object manipulation steps that are easier when the object to be rendered is treated as an underlying object and an overlying vector displacement map rather than as an object that happens to have a surface that already agrees with the displacements.

In some tools, such as Mudbox, an artist or other user can create displacements for an object interactively. Then, once the textured object is specified, the tool will attempt to map points on the textured object back to points on the original object, using ray tracing. This is very computationally expensive and is not exact. Therefore, improved methods may have uses for artists, animators and other users.

BRIEF SUMMARY

In embodiments of an animation processing system according to aspects of the present invention, a method and apparatus for generating vector displacement maps is provided, that accepts user input on vector displacements, often in an interactive manner. A vector displacement represents displacement of points or regions of an object being processed by the animation processing system. Given a set of objects to be animated or imaged, they can be each represented by one or more faces. In a subdivision (tessellation) process, faces are represented by polygons through a method of repeated subdividing (or other process). In the subdivision process, relative location of polygons relative to the original face (and possibly also their relative orientations) are maintained, for later use by other processes, such as a rendering or display process. This can be done by maintaining source data for each face of a subdivided surface, where the source data indicates an original location on the original object that corresponds to that face and the polygons resulting from the subdividing.

In specific implementations, the source data is a link, path, index or label for each face of the subdivision surface, where the source data indicates an original location on the original object that corresponds to that face. The original location can include a location and a rotation.

One advantage of the source data is that per-face texture maps can be easily generated from the displacements, since they can be easily mapped back to the original object.

The following detailed description together with the accompanying drawings will provide a better understanding of the nature and advantages of the present invention.

DETAILED DESCRIPTION

An improved image handling system is described herein, wherein objects are represented as geometric models and presented to a user for "sculpting" wherein the user provides inputs that form displacements of a surface of the object. The displacements are then stored as a vector displacement dataset (table, data structure, etc.) that is usable by a renderer and/or other image handling or processing system. The vector displacements are stored with reference to locations on the surface of the original object, wherein the locations are determined by a mapping maintained by the sculpting system during the sculpting process.

In part because the mapping is maintained by the sculpting system during the sculpting process, the system does not have to perform complicated processes, such as ray tracing, to determine which displacements correspond to which locations on the objects (or more precisely, the geometric models of those objects.

In a specific embodiment, during a process of generating a subdivision surface for an object, the sculpting system will maintain a link, path, index or label (referred to herein as "source data") for each face of the subdivision surface, where the source data indicates an original location on the original object that corresponds to that face. The original location can include a location and a rotation.

The original location information might be used for generating per-face texture maps from the displacements, since they can be easily mapped back to the original object. The texture maps might be in the form used by ptex or other software.

Figure 1:
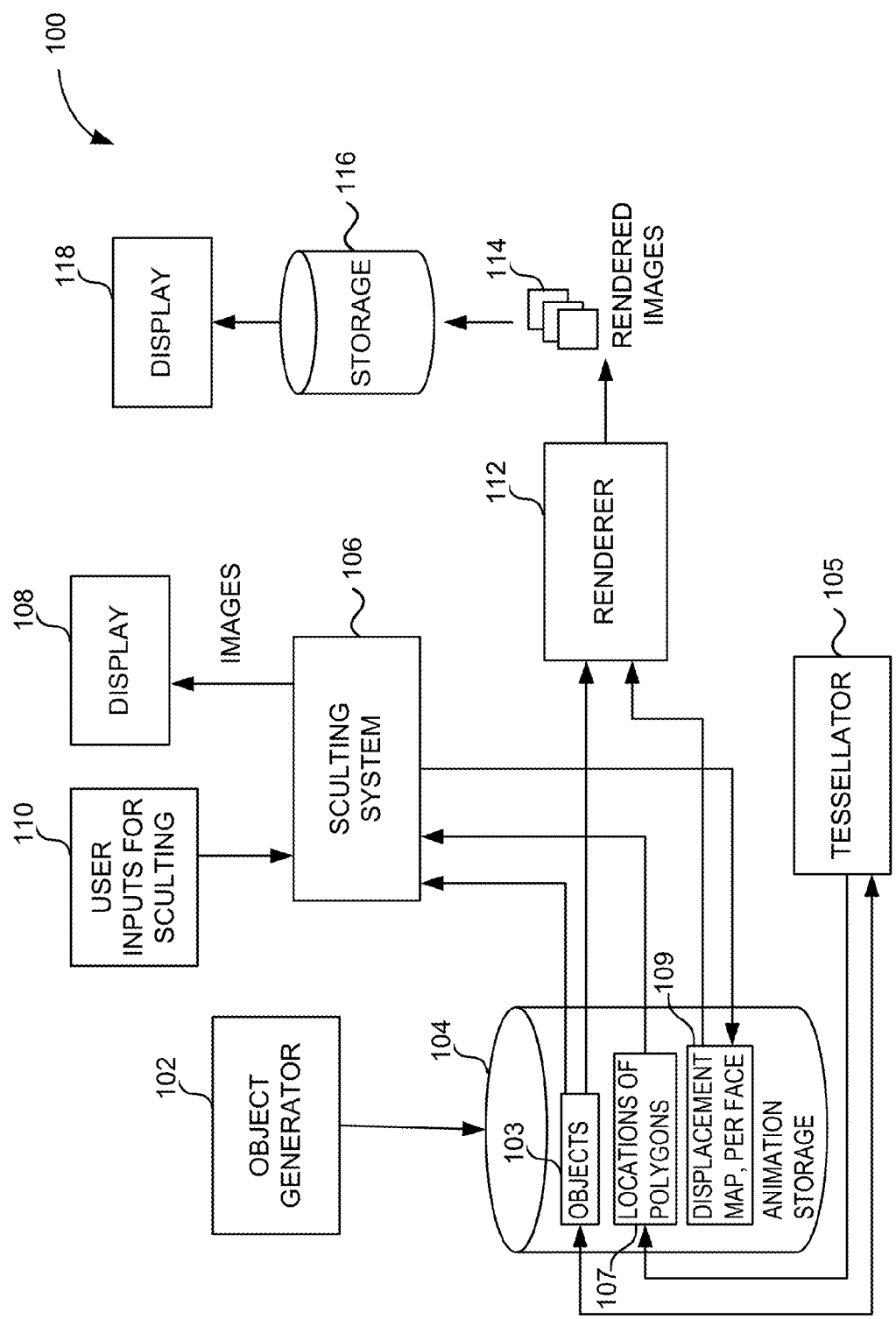
FIG. 1 is a block diagram of a system for sculpting and generating images.

Referring now to the figures, FIG. 1 is a block diagram of a system 100 for sculpting and generating images. As shown there, an object generator 102 generates geometric models and provides those to animation storage 104 for storage as objects 103. Object generator 102 can be a conventional system for generating objects used in an animation system and such objects could be, for example, a sphere, a cone, a teacup, a fish, a mouse, a building, a tree, a character, a representation of another real-world object, or the like. Typically, but not always, the geometric model for an object comprises a plurality of faces that define a surface of the object and the faces are specified in a three-dimensional coordinate space, with the details stored as objects 103.

A tessellator 105 reads geometric model for an object and subdivides the faces into polygons and then may iterate by further subdividing those polygons into smaller polygons. The process of deciding how to subdivide a given face or polygon is well-known and need not be described in detail herein. However, rather than just storing a geometric model as a collection of millions of polygons in object storage 103, tessellator 105 maintains or generates a data structure indicating how the polygons map to the original surface of the object—a locations map 107.

A sculpting system 106 reads geometric models from animation storage 104 (objects 103) as well as the locations map 107.

Sculpting system 106 can then present images on a display 108 and accept user inputs from various user input devices 110 corresponding to user changes to the surface of an object being sculpted. Examples of sculpting operations may include denting, scraping, flattening, carving, pinching, smoothing and the like. As the user inputs various changes to the surface, these can be represented as a vector displacement map that indicates, for each polygon that is displaced, a vector displacement of that polygon. Because sculpting system 106 has available to it locations map 107, it can output a displacement map for displacement storage 109 wherein the displacement map has its vectors mapped back to locations on the faces of the object, as well as being mapped to particular polygons of the object.

A renderer 112 can then read object from object store 103 and displacement maps from displacement storage 109 in order to generate rendered images 114 that are stored in rendered image storage 116 and can be displayed on display 118. In an interactive method of animation processing, display 118 and display 108 can be windows on common display hardware, as might be used in an iterative edit-generate-review process.

Figure 2:
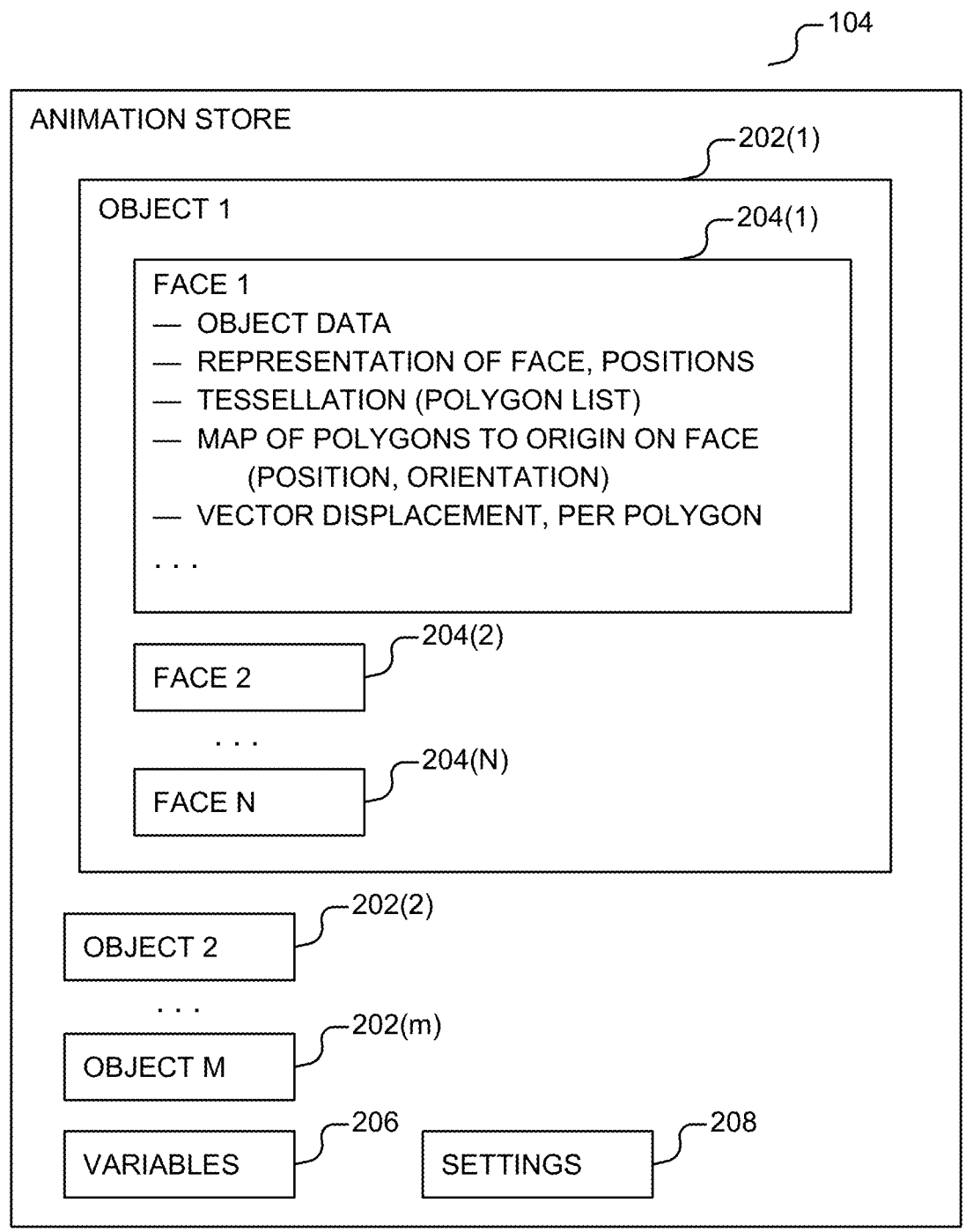
FIG. 2 illustrates an example of a data structure that might be used by the system shown in FIG. 1 to manage an image creation process.

FIG. 2 illustrates an example of a data structure that might be used by the system shown in FIG. 1 to manage an image creation process. The data structure is referred to as "animation store" 104 and can encompass any known or later developed storage device, so long as data can be stored therein and read therefrom. For example, the data structure might reside on a hard drive, RAM, storage array, or the like.

As illustrated, animation store 104 can hold storage for animation data on multiple objects 202, along with other variables 206 and settings 208. The data structure for each object 202 includes one or more substructures 204, one for each face of the object represented. The data structure for a face might include data about the object, the representation of the face, its positions, its bounds, a tessellation (e.g., a listing of polygons that together approximate or match the surface of the face), a map of the tessellation polygons to locations on the face (e.g., position of a polygon expressed in a coordinate space of the face and a rotation expressed relative to an origin angle of the face), a set of vector displacements (e.g., a vector for each polygon defining its displacement from the position of the polygon on the face prior to the displacement operations), along with possibly other information.

As explained elsewhere herein, having information that maps polygons of a tessellation to their corresponding location on a face (which can be done via the tessellation process), means that a sculpting system or an animation system does not have to go back later and attempt to regenerate that information.

Figure 3:
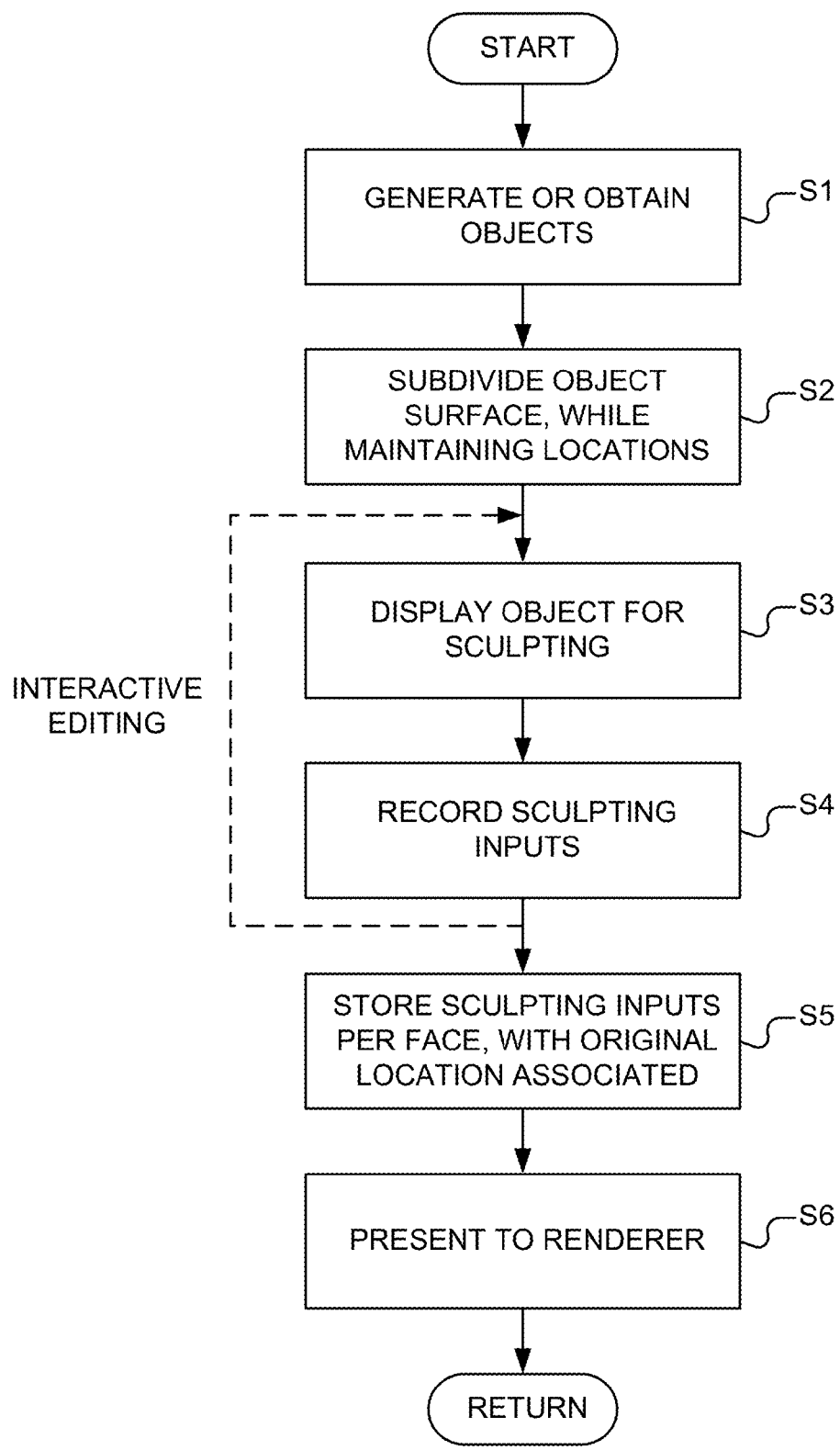
FIG. 3 illustrates a simplified flowchart showing a method for rendering a subdivided object.

FIG. 3 illustrates a simplified flowchart showing a method for rendering a subdivided object. While the steps in the figure are numbered S1, S2, etc., the implied ordering need not be the ordering that the steps are performed, unless otherwise specified. The process might be performed by a processor running software or special-purpose hardware of a sculpting system.

As illustrated, in step S1, the system generates or obtains objects. For example, there might be available a file that specifies a cube is to be presented at a particular location in a three-dimensional virtual space, a tree at another location, a cloud, a person, a car, a space ship, water, etc. at some other locations. Alternatively, the system might generate objects based on simulation data, declarative data defining objects, etc. In any case, once the system obtains the objects, or more precisely, the data defining and/or specifying the objects, at step S2, the system subdivides the objects into polygon lists, while maintaining locations and orientations of the polygons relative to the face surface.

At step S3, the system might display an object and provide a user with tools for specifying sculpting operations (cut here, stretch here, scratch there, dent, roll or pinch at another place, etc.) and at step S4, the system accepts corresponding user inputs. With interactive editing, steps S3 and S4 might be repeated, with the display being updated for each sculpting operation, or every few operations, etc.

Once the sculpting is done, at step S5, the system stores the sculpting inputs per face, with the original location associated with polygons. Thus, the stored data would maintain that a particular polygon, P, began as part of a face, F, of an object, O, at a location, L, and a rotation, R, and after sculpting provides for a displacement vector for polygon P, the stored data maintains the other data, so there is no need to go back a try to figure out, by ray tracing or other computationally-intensive methods, what location on face F polygon P should be associated with.

At that point, at step S6, the stored data can be provided to a renderer for suitable rendering.

The stored data for polygons can be in a number of foams, so long as it can be used for tracing back (or forward) to determine the displacement of each of a plurality of polygons performed by a sculpting program or process. In a simple case, stored data identifies polygons (so that different polygons can be distinguished from each other even though they have moved) and the stored data also identifies, for each of the polygons so tracked, an initial location, a current location and a displacement (although one might be calculated from the other two) are maintained along with the identifiers. Orientation might also be stored.

In a more complex, but still relatively simple case, the polygons are identified using a subdivision path rather than a particular identifier. For example, the path "FaceA-1-2-2-1-4-1" might represent the polygon that results from subdividing "FaceA" specifically referring to the polygon that appears when FaceA is subdivided into four faces, the first of those faces (FaceA-1) is subdivided into four faces, the second of those (FaceA-1-2) is subdivided into four faces, the second of those (FaceA-1-2-2) is subdivided into four faces, etc. A processor can then locate an original location of a polygon by traversing the stored path.

The location of a polygon might be stored as the center point of the polygon, or the boundaries or other positional information. In some cases, the stored data also includes adjacency information, so that it would be a simple matter, reading the stored data for a polygon, to determine which other polygons are adjacent. Adjacency can vary by how the subdivision is done, such as by different orderings (and possibly orientations) of the subdivided polygons.

One use of the stored information is to easily identify an original location of a polygon after a sculpting program or process has moved the polygon.

This can be easily one if there are stored data structures available that, for a given post-sculpting polygon, provide a polygon identifier and that also provide a table or other structure that provides initial locations for a plurality of polygons and their corresponding polygon identifiers. The initial location for a given polygon, say "PolyA123" of a face "FaceA," might be determined by determining the location of points on FaceA and each time FaceA is subdivided, storing the locations for points (e.g., center points) for the resulting polygons based on stored locations for the polygons from which they were subdivided out. If one at each iteration of the subdivision, the initial location of each polygon would then be known, as well as an identifier usable to distinguish that polygon from others.

In another approach, after the surfaces are subdivided, but before they are sculpted, a locating process identifies where each of the polygons are and notes that, along with the polygons' identifiers.

Following the sculpting process or program execution, there will be polygons that are displaced. The displacement can be a scalar displacement (such as a displacement normal to the surface), but it can also be a vector displacement. The set of vector displacements for a set of polygons can be stored as displacement for each polygon relative to its original, undisplaced location, or a location of the polygon post-sculpting, or some other arrangement.

Figure 4A:
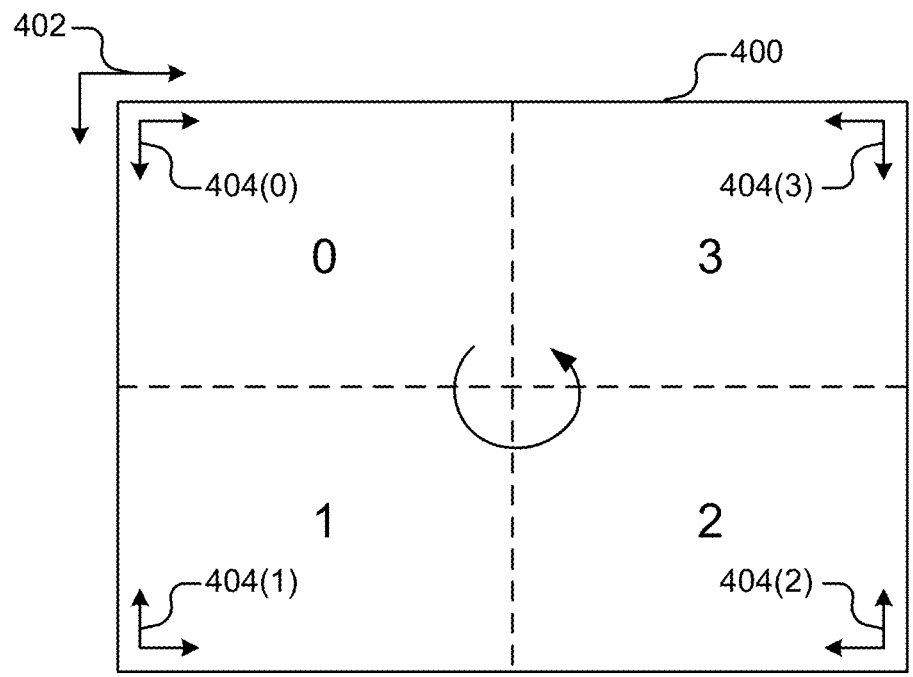
FIGS. 4A and 4B illustrate subdivision numbering schemes.
Figure 4B:
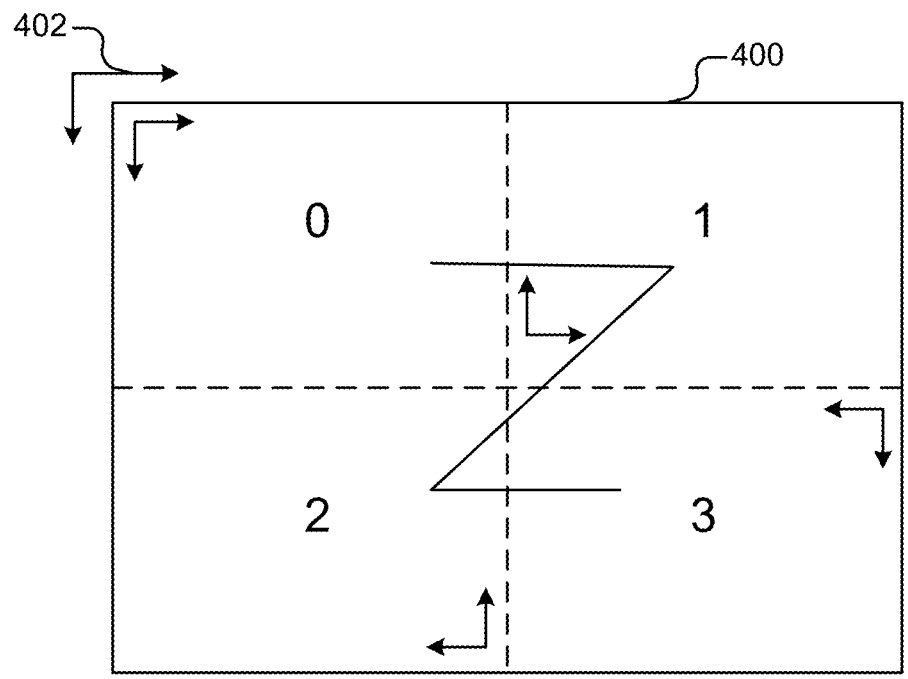

FIGS. 4A and 4B illustrate subdivision numbering schemes.

FIG. 4A illustrates a tessellation of a rectangle into four smaller rectangles. As illustrated, rectangle 400 has an orientation and position defined by its origin and coordinates 402, whereas the subrectangles have their orientation and position defined by their origins and coordinates 404. In this approach, the subdivided rectangles might be numbered in a counter-clockwise winding, as illustrated in FIG. 4A with the labels "0", "1", "2", and "3".

FIG. 4B illustrates a tessellation of rectangle 400 into four smaller rectangles in a different manner, wherein rectangle 400 has the same orientation and position defined by its origin and coordinates 402, but the subrectangles occur in different orders, have different orientations and positions. In that approach, the subdivided rectangles might be numbered in a Z-order winding, as illustrated in FIG. 4B with the labels "0", "1", "2", and "3".

Yet another approach, not pictured, is to use a Hilbert curve to "walk" a two-dimensional surface to provide an ordering of subdivisions of the surface. Other windings or orderings might be used. Where each subdivision involves dividing a surface (in the first pass) into four subdivisions or dividing a subdivision (in subsequent passes) into four smaller subdivisions, the subdivisions might be referred to as "quads" or similar term. While subdividing by quads is very common, the present invention is not limited to an iterative quad subdivision process.

It should be apparent, upon reading this disclosure, that with these tessellation schemes, the positions of each subdivision could be known relative to its original face, as that information is maintained over the tessellation process, whereas if that information was not retained, it would be difficult to compute that information for multiple iterations of a subdivision process.

It would also be difficult to translate between two schemes. For example, if a surface is initially tessellated using Z-order winding, some manipulation of the surface is done by one tool, and then there is an attempt to store the result into a system that requires a counter-clockwise winding, it would be difficult to determine mappings between subdivisions in the data stored by one tool to the mappings required by another tool. However, as explained herein, if the relationship between subdivided quads (or other subdivisions) and their original locations on the surface, then changes, attributes, etc. that are made or applied to one representation can easily be applied to the other representation.

For example, there might be one tool, program or storage system that accommodates only Z-order winding data and another tool, program or storage system that accommodates only counter-clockwise winding data. Suppose that a tessellated surface is stored with a first winding, but it is desired to have user input on changes to the surface using a tool that operates with data stored with a second winding, different from the first winding. This can be easily dealt with, because while the tool might apply the user input to the surface in specific places (such as modifying texture, color or other attribute of a particular spot on the surface), those manipulations can be easily mapped back to the original location on the first winding order.

Figure 5:
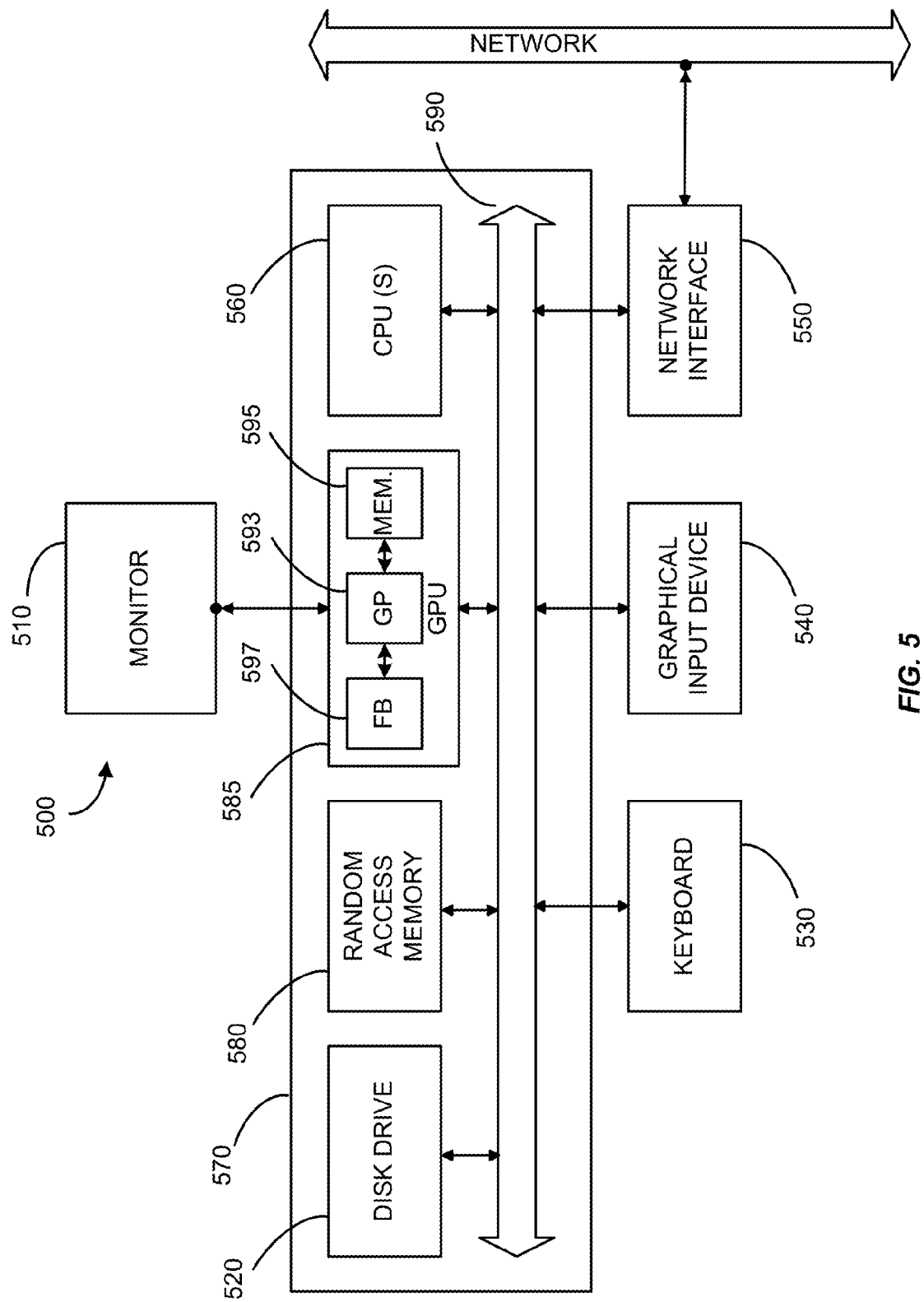
FIG. 5 is a block diagram of a computer system that may be used to practice various embodiments.

FIG. 5 is a block diagram of a computer system that may be used to practice various embodiments. FIG. 5 is merely illustrative of an embodiment incorporating the present invention and does not limit the scope of the invention as recited in the claims. One of ordinary skill in the art would recognize other variations, modifications, and alternatives.

In one embodiment, computer system 500 typically includes a monitor 510, computer 520, a keyboard 530, a user input device 540, computer interfaces 550, and the like.

In various embodiments, user input device 540 is typically embodied as a computer mouse, a trackball, a track pad, a joystick, wireless remote, drawing tablet, voice command system, eye tracking system, and the like. User input device 540 typically allows a user to select objects, icons, text and the like that appear on the monitor 510 via a command such as a click of a button or the like.

Embodiments of computer interfaces 550 typically include an Ethernet card, a modem (telephone, satellite, cable, ISDN), (asynchronous) digital subscriber line (DSL) unit, FireWire interface, USB interface, and the like. For example, computer interfaces 550 may be coupled to a computer network, to a FireWire bus, or the like. In other embodiments, computer interfaces 550 may be physically integrated on the motherboard of computer 520, and may be a software program, such as soft DSL, or the like.

In various embodiments, computer 520 typically includes familiar computer components such as a processor 560, and memory storage devices, such as a random access memory (RAM) 570, disk drives 580, a GPU 585, and system bus 590 interconnecting the above components.

In some embodiment, computer 520 includes one or more Xeon microprocessors from Intel. Further, one embodiment, computer 520 includes a UNIX-based operating system.

RAM 570 and disk drive 580 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 585 may be any conventional graphics processing unit that may be user programmable. Such GPUs are available from NVIDIA, ATI, and other vendors. In this example, GPU 585 includes a graphics processor 593, a number of memories and/or registers 595, and a number of frame buffers 597.

FIG. 5 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Figure 6A:
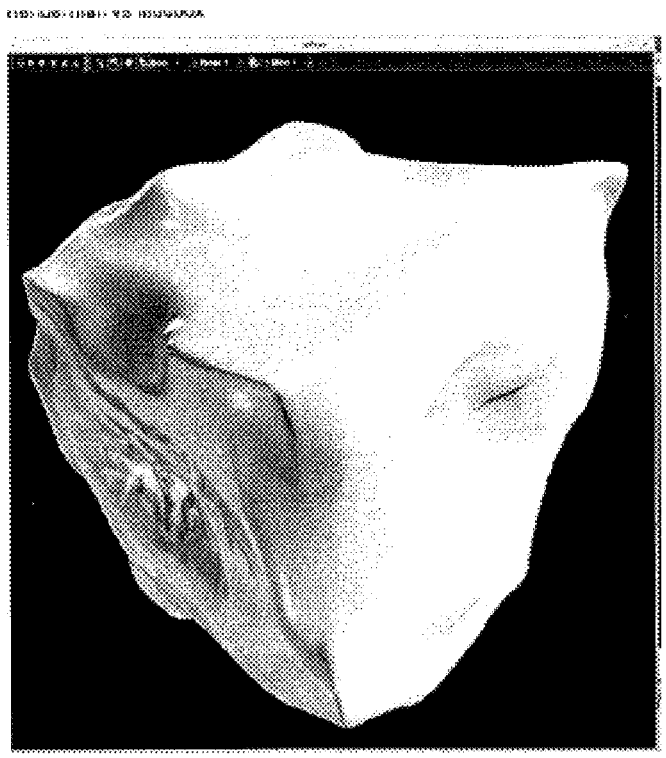
FIG. 6A and FIG. 6B are screen shots of a sculpting system.
Figure 6B:
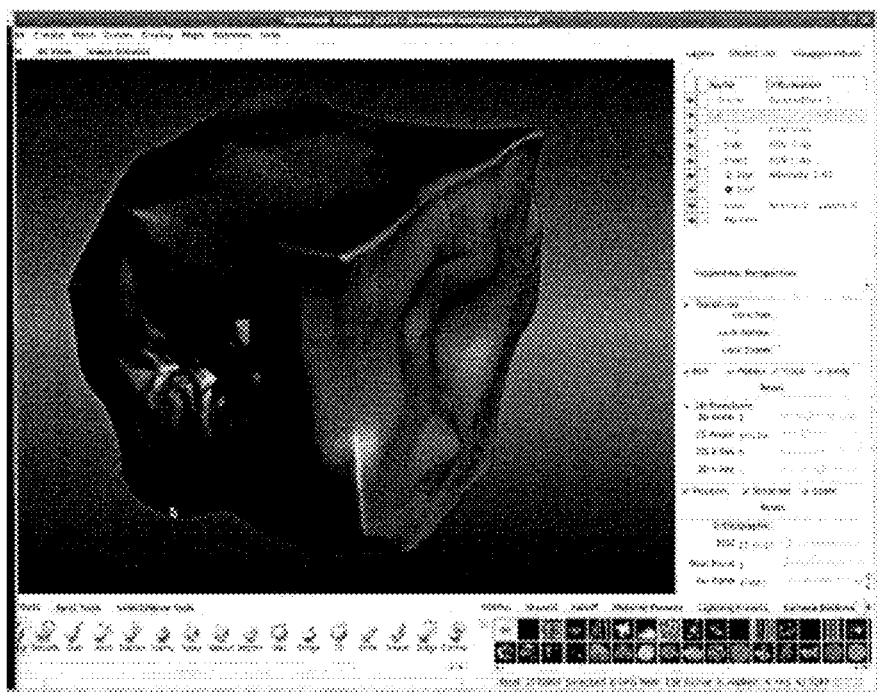

FIG. 6A and FIG. 6B are screen shots of a sculpting system.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In an animation processing system, having a display or capability to output a display, a processor and memory, a method of generating a per-face vector displacement map, wherein a vector displacement represents displacement of points or regions of an object being processed by the animation processing system, the method comprising:
   identifying, by a processor, an object to be processed, wherein the object is represented by data structures;
   identifying a plurality of faces of the object to be processed;
   subdividing, by a sequence of subdivision steps, a first face in the plurality of faces into polygons that at least approximate the first face, wherein the polygons are smaller than the first face;
   storing, for each subdivision step in the sequence of subdivision steps, a location of an original polygon and locations of a plurality of smaller polygons obtained from subdividing the original polygon;
   accepting vector displacement information for a first polygon of the after polygons, the vector displacement being relative to the location of the first polygon subdividing;
   identifying a displaced position of the first polygon based on the vector displacement information;
   determining an original location on the first face of the object corresponding to the first polygon by determining, for one or more of the subdivision steps, a location of an original polygon associated with a subdivided polygon; and
   generating a per-face vector displacement map for the first face using the original location of the first polygon and the displaced position of the first polygon, wherein the per-face vector displacement map comprises a displacement from the original location on the first face to the displaced position of the first polygon.

2. The method of claim 1, wherein the determining the original location corresponding to the first polygon further comprises determining information linking the first polygon to an original orientation on the first face.

3. The method of claim 1, wherein the locations of the plurality of smaller polygons include center points of the polygons resulting from the subdividing.

4. The method of claim 1, further comprising storing adjacency information, wherein adjacency information for a given polygon indicates which other polygons are adjacent on a surface to the given polygon, wherein the original location corresponding to the first polygon is determined using the adjacency information.

5. The method of claim 4, wherein the adjacency information is in the form of a listing, for each of a plurality of polygons, of identifiers for adjacent polygons.

6. The method of claim 4, wherein the adjacency information is in the form or a listing, for each of a plurality of polygons, of identifiers for adjacent polygons that would be adjacent according to some winding.

7. The method of claim 6, wherein the winding is a Z-order winding.

8. The method of claim 6, wherein the winding is a Hilbert-order winding.

9. The method of claim 1, wherein the vector displacement information is displacement relative to a location in a global space, for each of a plurality of polygons.

10. The method of claim 1, further comprising:
    storing, for each polygon, a subdivision path, wherein a subdivision path for a given polygon comprises a sequence of subdivided polygons resulting from a plurality of subdivision steps; and traversing a subdivision path for the first polygon to determine an original location on the original object corresponding to the first polygon, wherein the original location is determined using the location of the original polygon associated with a subdivided polygon for each of a plurality of subdivision steps in the subdivision path.

11. A computer program product comprising non-transitory tangible media including executable software computer code comprising:

program code for identifying an object to be processed, wherein the object is represented by data structures;

program code for identifying a plurality of faces of the object to be processed;

program code for subdividing, by a sequence of subdivision steps, a first face in the plurality of faces into polygons that at least approximate the first face, wherein the polygons are smaller than the first face;

program code for storing, for each subdivision step in the sequence of subdivision steps, a location of an original polygon and locations of a plurality of smaller polygons obtained from subdividing the original polygon;

program code for accepting vector displacement information for a first polygon of the polygons, the vector displacement being relative to the location of the first polygon after the subdividing;

program code for identifying a displaced position of the first polygon based on the vector displacement information;

program code for determining an original location on the first face of the object corresponding to the first polygon by determining, for one or more of the subdivision steps, a location of an original polygon associated with a subdivided polygon; and program code for generating a per-face vector displacement map for the first face using the original location of the first polygon and the displaced position of the first polygon, wherein the per-face vector displacement map comprises a displacement from the original location on the first face to the displaced position of the first polygon.

12. The computer program product of claim 11, further comprising storing adjacency information, wherein adjacency information for a given polygon indicates which other polygons are adjacent on a surface to the given polygon, wherein the original location corresponding to the first polygon is determined using the adjacency information.

13. The computer program product of claim 12, wherein the adjacency information is in the form of a listing, for each of a plurality of polygons, of identifiers for adjacent polygons.

14. The computer program product of claim 12, wherein the adjacency information is in the form or a listing, for each of a plurality of polygons, of identifiers for adjacent polygons that would be adjacent according to some winding.

15. The computer program product of claim 14, wherein the winding is a Z-order winding.

16. The computer program product of claim 14, wherein the winding is a Hilbert-order winding.

17. The computer program product of claim 11, wherein the vector displacement information is displacement relative to a location in a global space, for each of a plurality of polygons.

18. The computer program product of claim 11, wherein the non-transitory tangible media including executable software computer code further comprises:

program code for storing, for each polygon, a subdivision path, wherein a subdivision path for a given polygon comprises a sequence of subdivided polygons resulting from a plurality of subdivision steps; and program code for traversing a subdivision path for the first polygon to determine an original location on the original object corresponding to the first polygon, wherein the original location is determined using the location of the original polygon associated with a subdivided polygon for each of a plurality of subdivision steps in the subdivision path.

* * * * *

UNITED STATES PATENT AND TRADEMARK OFFICE
CERTIFICATE OF CORRECTION

PATENT NO. : 8,659,600 B2  Page 1 of 1
APPLICATION NO. : 13/182384
DATED : February 25, 2014
INVENTOR(S) : Kraemer et al.

It is certified that error appears in the above-identified patent and that said Letters Patent is hereby corrected as shown below:

In the Claims

Claim 1, column 8, line 21,
    Please delete "after"

Claim 1, column 8, line 22,
    Please insert --after-- after "polygon"

Signed and Sealed this
Twenty-fourth Day of June, 2014

Michelle K. Lee
*Deputy Director of the United States Patent and Trademark Office*